United States Patent [19]

Yamamoto

[11] Patent Number: 5,474,863
[45] Date of Patent: Dec. 12, 1995

[54] SEALED LEAD ACID BATTERIES WITH POROUS POLYMER PARTICLES

[75] Inventor: Osamu Yamamoto, Hirakata, Japan

[73] Assignee: Matsushita Electric Industrial Co., Ltd., Osaka, Japan

[21] Appl. No.: 172,288

[22] Filed: Dec. 23, 1993

[30] Foreign Application Priority Data

Dec. 25, 1992 [JP] Japan ..................... 4-345716

[51] Int. Cl.$^6$ ............................ H01M 4/14; H01M 10/06
[52] U.S. Cl. ................................... 429/225; 425/215
[58] Field of Search ..................... 429/214, 215, 429/212, 225

[56] References Cited

U.S. PATENT DOCUMENTS

| | | | |
|---|---|---|---|
| 2,177,062 | 10/1939 | Gibbons et al. | 429/225 |
| 2,345,035 | 3/1944 | Daily et al. | 429/225 |
| 2,866,840 | 12/1958 | Dittman et al. | 429/215 |
| 4,238,557 | 12/1980 | Shulte et al. | 429/212 |
| 4,548,835 | 10/1985 | Takahashi et al. | 427/123 |
| 4,748,093 | 5/1988 | Turner | 429/81 |

FOREIGN PATENT DOCUMENTS

| | | | |
|---|---|---|---|
| 49-83835 | 8/1974 | Japan . | |
| 54-60429 | 5/1979 | Japan . | |
| 58-12263 | 1/1983 | Japan . | |
| 3-22355 | 1/1991 | Japan . | |
| 155944 | 1/1921 | United Kingdom | 429/212 |

*Primary Examiner*—Stephen Kalafut
*Assistant Examiner*—Carol Chaney
*Attorney, Agent, or Firm*—Wenderoth, Lind & Ponack

[57] ABSTRACT

The sealed lead acid battery comprises a positive and/or negative electrode made of an active material added with porous polymer particles having an average pore diameter of 0.05 to 10 μm and a particle size of 0.1 to 0.8 mm. The additive amount of the porous polymer particles ranges from 0.2 to 3 wt. %. The active material may be incorporated with porous particles of 0.3 to 5 wt. % previously impregnated therein with sulfric acid. The resultant sealed lead acid battery has a high energy density and is superior in a high efficient discharge characteristic, a cycle life characteristic and a low temperature characteristic.

14 Claims, 6 Drawing Sheets

SEALED LEAD ACID BATTERIES WITH POROUS POLYMER PARTICLES

BACKGROUND OF THE INVENTION

1. Field of the Invention

The present invention is related to sealed lead acid batteries characterized by an active material in a positive or negative electrode.

2. Description of the Prior Art

In general, a lead acid battery is a battery which has a stable characteristic at a lower cost as a secondary battery and which is used widely as an electric power source of a movable type for use in a portable electronic apparatus, a starter for automobile or a golf cart and a stationary type for use in a back up electric source for computer.

Recently, much demand has been directed to a sealed lead acid battery of high quality for use as an electric power source in an electric car. Specially, an important problem is to realize a high energy density discharge and increase a cycle life at a high efficiency discharge (a high current in a short time).

These problems are greatly related to an active material and an electrolyte (sulfuric acid). As a practical matter, the actual energy density is one third of the theoretical value. The reason is that although it is assumed that the active material and the electrolyte react completely with each other, it is believed that only a small amount of sulfuric acid can contribute to the discharge reaction in an actual battery. Specially, in the sealed lead acid battery, sulfuric acid impregnated in a separator reacts mainly with the surface of the electrode plate and sulfuric acid impregnated previously in the active material reacts with the electrode plate at a close position to a grid for an electric current collector. It is believed that a liquid type lead acid battery also has a lower energy density due to incomplete diffusion of the sulfuric acid into the active material and incomplete reaction with the active material.

It is believed that the capacity decay in the cycle life occurs when the active material grows to a crystalline lead sulphate in a passive state during the repetition of charge and discharge operation and has no effective function on the battery reaction. Another reason is that pores having a size less than 0.1 micron increase while pores having an intermediate size of 0.1 to several microns decrease, since small pores less than 0.1 micron causes sulfuric acid to diffuse hardly into the active material.

Therefore, in order to improve initial capacity, energy density and discharge characteristics efficiently, there is proposed a method to increase the amount of sulfuric acid in order to increase the energy density or porosity of the active material (a decrease in the apparent density) in order to improve the diffusion rate of sulfuric acid. This method, however, has a disadvantage such as the cycle life is shortened because the increase in the pore size causes the generation of crystalline lead sulphate of a larger grain size which results in a more accelerated passive state of the active material.

In order to prevent the passive state of crystalline lead sulphate which is essentially an insulating material, a possible method is to mix the active material with a conductive material such as anisotropic graphite or tin oxide or zeolite having sulfuric acid impregnated therein and porous silica coated with titanium (for example, see Japanese Patent laid-open Publication No. 54-60429, 58-12263, and 3-22355). Another disclosed method is to add porous silica having an elastic property in order to absorb the strain of expansion and shrinkage at the charge and discharge operation so that the cycle life is improved (for example, see U.S. Pat. No. 4, 548,835, U.S. Pat. No. 4, 748,093).

It is possible to prevent the passive state of the lead sulphate in order to improve the cycle life to some extent by adding a conductive material such as tin oxide to the active material. However, sulfuric acid shows no change in the diffusion rate in view of the discharge at a high efficiency. A supply of sulfuric acid from the separator is not sufficiently quick so that a decrease in the capacity can not be prevented during the discharge at a high efficiency. Further, an addition of zeolite to the active material results in an increase in the amount of sulfuric acid at a position near the active material and is effective for an increase in the capacity at a high efficiency. However, alkali metal oxide such as sodium oxide or potassium oxide contained in the zeolite solves into the active material and impairs the active material. As a result, the addition of zeolite has no effect on the cycle life.

On the other hand, the addition of porous silica coated with titanium permits sulfuric acid to be distributed uniformly around the active material to some extent and has an effect to improve the discharge characteristics at a high efficiency and initial capacity. However, this method has a disadvantage that sulfuric acid hardly diffuses into the inside of particles of the active material, thereby lowering the effect on the improvement of the discharge characteristic. Further, the porosity increases during mixing so that the cycle life becomes short. In the case of the elastic porous silica, there is found a little effect on the improvement of the cycle life and there is found no improvement of the energy density because of the small increment of the amount of sulfuric acid and the large specific gravity of the elastic porous silica.

SUMMARY OF THE INVENTION

In view of the problems mentioned above, a first object of the present invention is to provide a sealed lead acid battery capable of improving the initial capacity, discharge capacity and low temperature characteristic by increasing the effective amount of sulfuric acid contained in the active material.

Further, a second object of the present invention is to provide a sealed lead acid battery capable of improving the cycle life by suppressing the porosity of the active material and preventing the generation of lead sulphate of a large crystal grain.

According to a first aspect of the present invention, in order to achieve a sealed lead acid battery superior in the cycle life and further in the initial capacity, discharge capacity at a high efficiency and a low temperature characteristic, there is provided a sealed lead acid battery wherein porous polymer particles or porous material having electrolyte impregnated previously therein is added to the active material in the negative or positive electrode.

The preferred porous polymer particles are of a polymer of styrene-divinylbenzene having a three dimensional crosslinking structure. The effective dimension is that the pore size is 0.05 to 10 µm, an average particle size is 0.1 to 0.8 mm (apparent density is less than 0.5 g/cm$^3$). The porous polymer particles are preferably added by 0.2 to 3.0 wt % of the active material. Alternatively, it is possible to add 0.3 to 5 wt % of a porous material such as porous polymer particles, porous silica, apatite having the electrolyte impregnated previously therein through a vacuum impregnation method. In cases of a positive electrode limited sealed lead acid battery, an addition of the porous material to the positive electrode obtains a greater effect than an addition of the porous material to the negative electrode.

The energy density of the lead acid battery is proportional to the amount of sulfuric acid reactive with the active material. In the sealed lead acid battery, it has been found that the active material effective to the battery reaction is located only at a position in contact with the separator at the vicinity of the surface of the electrode plate and at a position close to a grid of current collector. In order to realize a high energy density, it is necessary for sulfuric acid to react with the active material in the inside of the electrode as deep as possible.

The porous polymer particles according to the present invention are porous material which is light (polymer has a specific gravity of 1.1 g/cm$^3$) because of a polystyrene framework and is provided with many fine pores. Further, the particles are of a structure enforced by a three dimensional crosslinking structure and have strong mechanical strength and a high chemical resistance. Even when the polymer particles contain sulfuric acid as an electrolyte, the polymer particles are hardly degraded. On the other hand, the polymer particles provided with pores in a diameter of 0.05 to 10 μm easily absorb the electrolyte solution. When the active material is mixed with the polymer particles having electrolyte solution previously impregnated therein and is formed into a hard electrode plate, it is easy to supply uniformly sulfuric acid to all of the electrode because of the presence of sulfuric acid in the inside of the electrode. This makes it possible to obtain a sealed lead acid battery superior in energy density, discharge capacity at a high efficiency and low temperature characteristics. Besides, the active material (electrode plate) of a low porosity prevents the generation of a large crystal particle causing the passive state of the lead sulphate. This prevents the active material from being softened and makes it possible to achieve a sealed lead acid battery superior in the cycle life.

Even when the porous polymer particles are added directly to the active material, sulfuric acid diffuses into the inside of the porous polymer particles during a paste kneading operation. This method makes it possible to elevate the energy density but is inferior to the vacuum impregnation method in the improvement of the energy density.

On the other hand, a vacuum impregnation method to impregnate previously the electrolyte solution into the porous polymer particles is very effective for improving the energy density because the vacuum impregnation method can absorb a larger amount of sulfuric acid than the mere kneading method mentioned above. The suitable additive amount of these polymer particles ranges from 0.3 to 5 wt. %.

A critical porosity of the active material necessary for improving the cycle characteristic is expressed by an apparent density higher than 4.5 g/cm$^3$ of the positive electrode material and by an apparent density higher than 5.1 g/cm$^3$ of the negative electrode material. The adjustment in the apparent density can be carried out by an amount of sulfuric acid during the kneading. A higher amount of sulfuric acid results in a higher porosity and a lower apparent density. It is possible to increase the amount of sulfuric acid and to prevent a decrease in the apparent density by kneading the porous material having sulfuric acid previously impregnated therein.

BRIEF DESCRIPTION OF THE DRAWINGS

These and other objects and features of the present invention will become clear from the following description taken in conjunction with the preferred embodiments thereof with reference to the accompanying drawings, and in which.

DETAIL DESCRIPTION AND PREFERRED EMBODIMENT OF THE INVENTION (Example 1)

Figure 1:
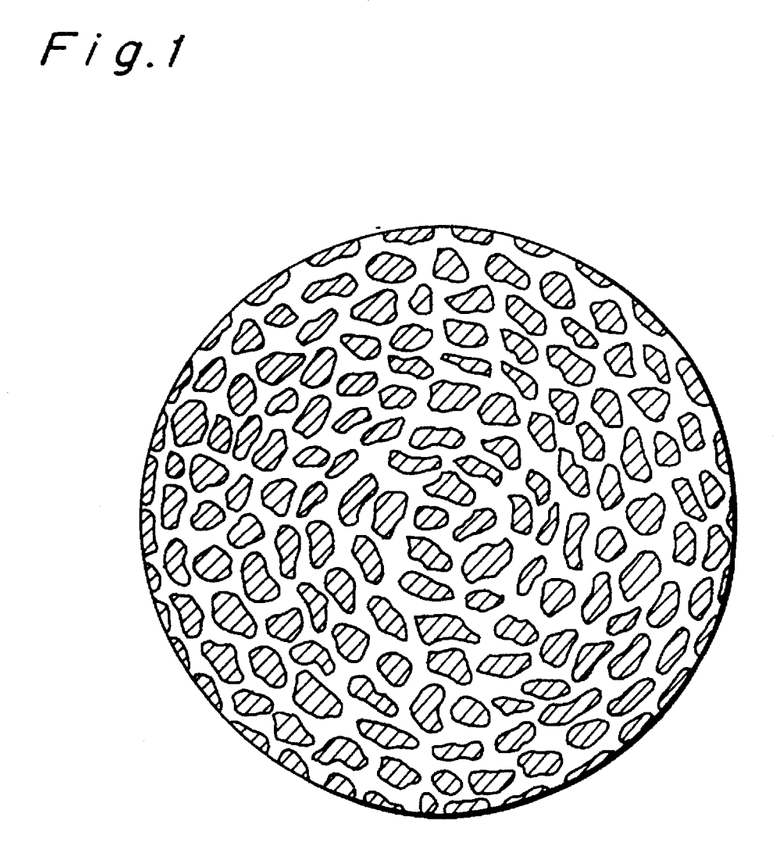
FIG. 1 is a cross sectional view of porous polymer particle used in the first embodiment of the present invention.
Figure 2:
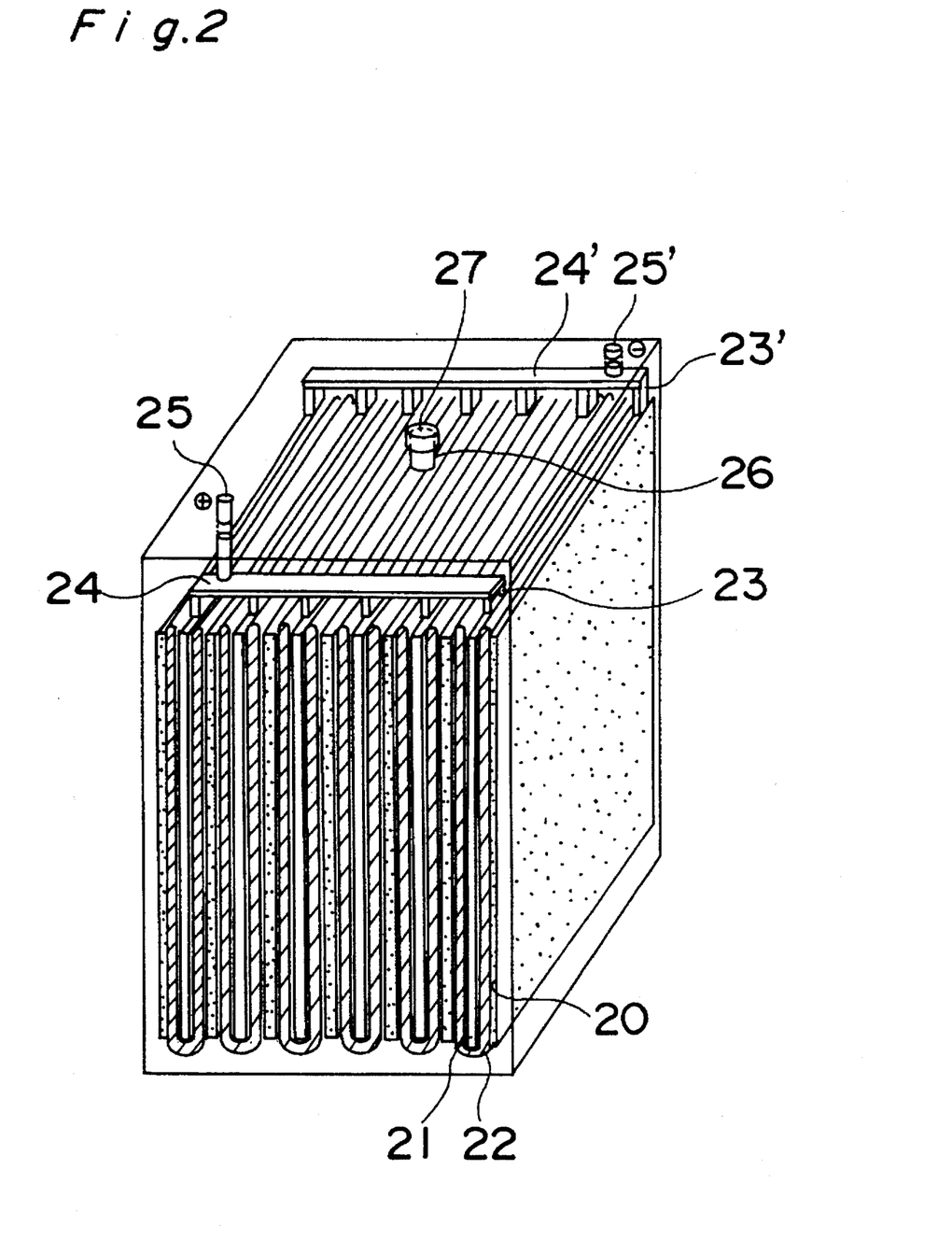
FIG. 2 is a perspective view of the sealed lead acid battery according to the first embodiment of the present invention.

The following description will be directed to the first embodiment of the present invention. FIG. 1 is a cross sectional view of an enlarged porous polymer used in the first embodiment. FIG. 2 is a perspective view of a lead acid battery according to the first embodiment of the present invention. Referring to FIG. 2, a reference numeral 20 denotes a negative electrode plate; a reference numeral 21 denotes a positive electrode plate; a reference numeral 22 denotes a separator; reference numerals 23 and 23' denote leads; reference numerals 24, and 24' denote shell; reference numerals 25 and 25' denote electrode pillar; a reference numeral 26 denotes an electrolyte inlet; a reference numeral 27 denotes a rubber cap; and a reference numeral 28 denotes a battery container. An active material is composed of lead powder of 100 weight part, porous polymer particles of 0.5 weight part, sulfuric acid (density, 1.35 g/cm$^3$) of 7 weight part, water of 10 weight part, barium sulfate, $BaSO_4$ of 1 weight part, and lignin of 0.2 weight part. The porous polymer particles are composed of styrene-divinylbenzene copolymer having three dimensional crosslinking structures (made by Mitubishi Kasei Co. Ltd. in Japan, porous polymer beads; average particle size, 0.2 mm, pore diameter, 0.05 to 3 μmm). The above mixture is kneaded into a paste form and is applied to a grid composed of Pb—Ca alloy. Then the paste on the grid is subjected to an acid immersion and a curing treatment. The resultant active material is of a apparent density of 5.2 g/cm$^3$(usual apparent density ranges from 4.8 to 5.0 g/cm$^3$) and is formed into a negative electrode plate 20.

The battery container 28 has 6 pieces of negative electrode plates formed in the above way and 7 pieces of positive electrode plates 21 of conventional composition inserted therein. The negative electrode plate 20 is packed with a separator 22 composed of glass fiber. The shells 24 and 24' and the electrode pillars 25 and 25' are prepared in a conventional way and attached to the electrode plates. The electrolyte sulfuric acid is adjusted to be a density of 1.30 g/cm$^3$ after the formation and then is poured into the battery container from the electrolyte inlet (vent plug) 26. Finally, a negative electrode limited type sealed lead acid battery is completed by being subjected to the formation process.

Figure 3:
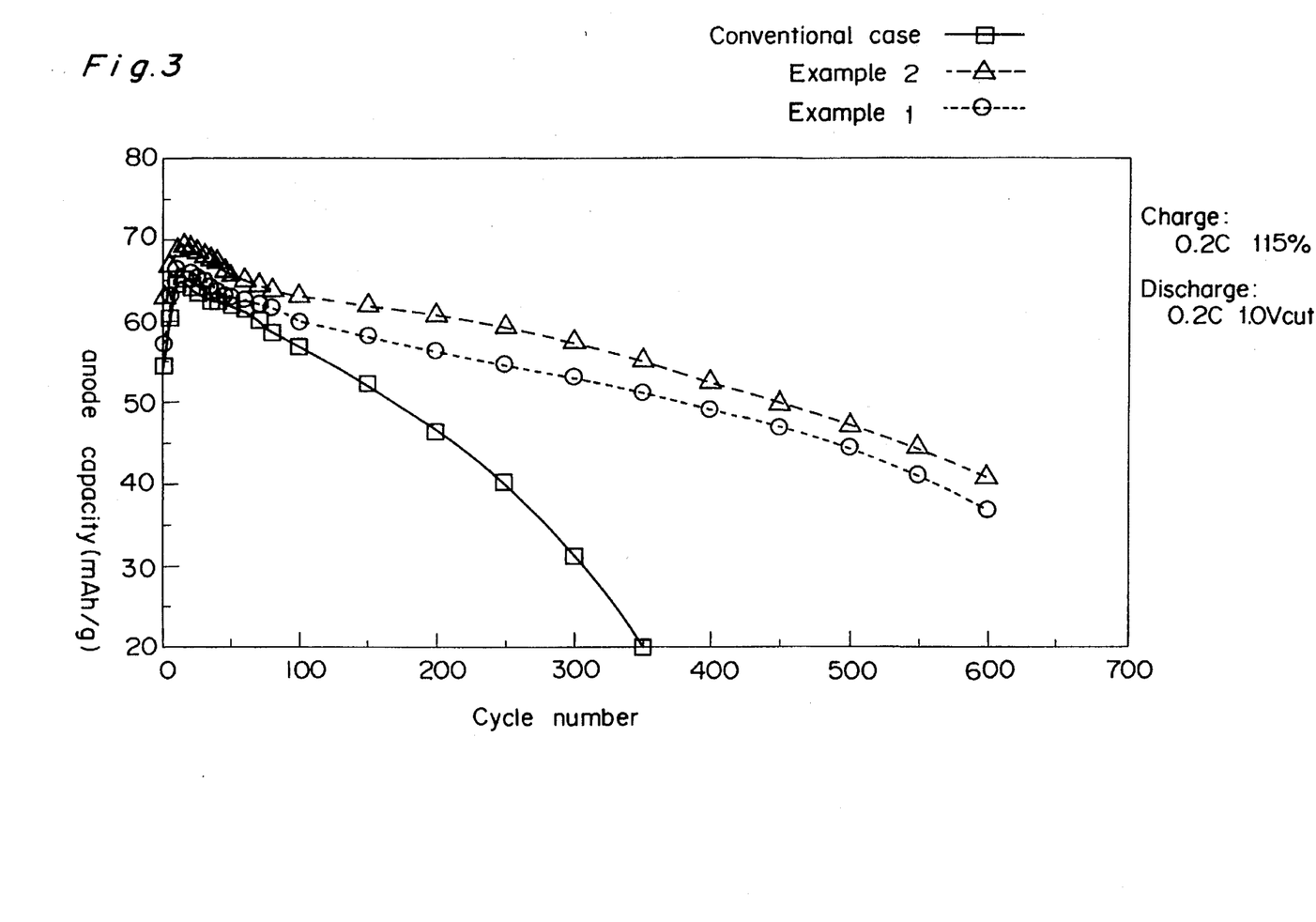
FIG. 3 is a graph showing a relationship between the capacity and the cycle number of the sealed lead acid battery according to the first and the second embodiments of the present invention.
Figure 4:
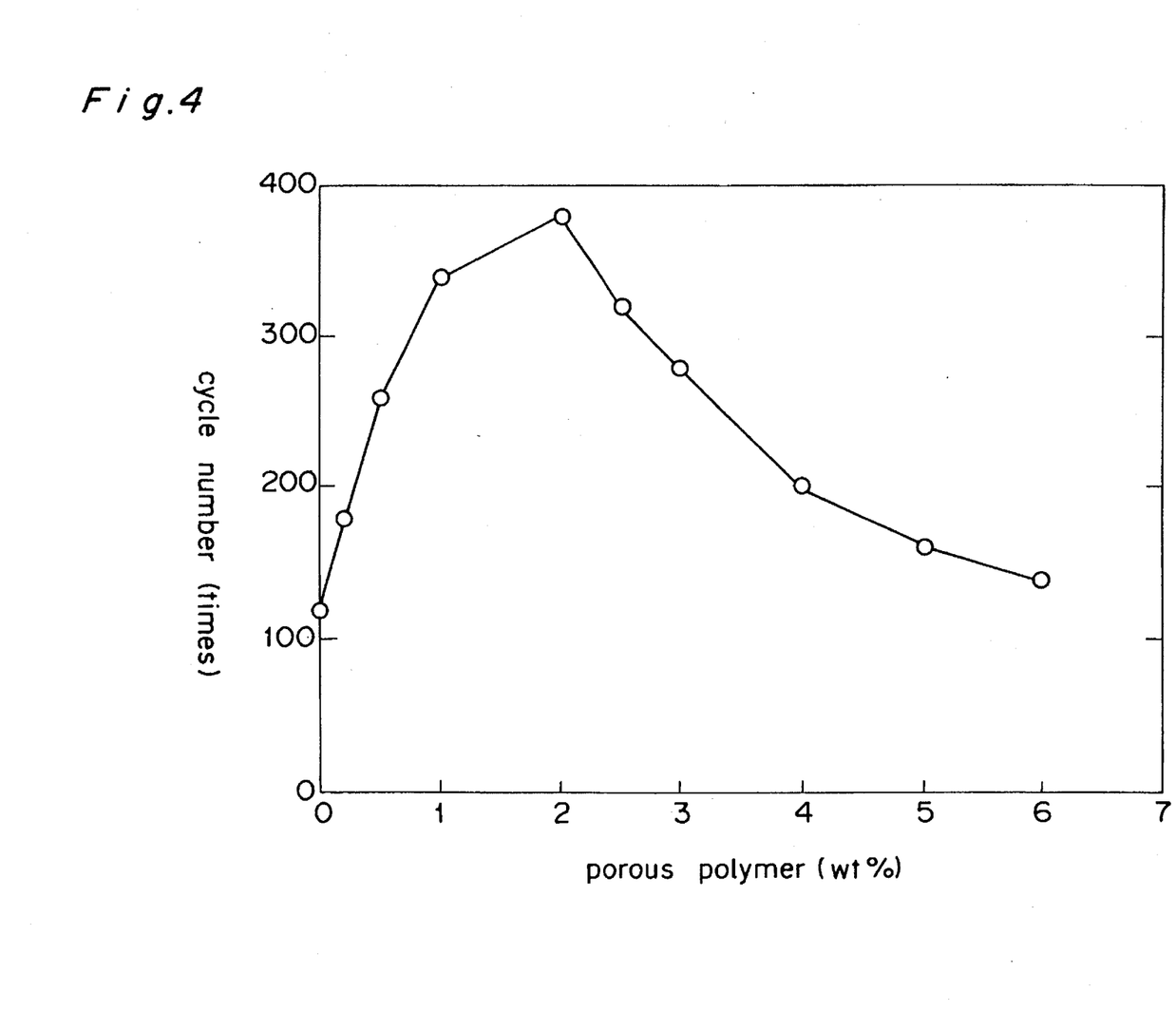
FIG. 4 is a graph showing a relationship between the amount of the porous polymer particles and the cycle life in accordance with the first embodiment of the present invention.

The sealed lead acid battery prepared by a way mentioned above has a capacity that the discharge amount of a 3 hour rate is 59 Ah and the energy density is 38 Wh/kg (conventional sealed lead acid battery has a capacity of 34 Wh/kg). FIG. 3 is a graph showing a relationship between the anode capacity and the cycle number at 0.2 C charge and discharge operation. FIG. 4 is graph showing a relationship between the amount of the porous polymer particles and the cycle life at a pattern discharge (SFUDS). The first embodiment according to the present invention shows a large improvement in the cycle life when the active material is mixed with the porous polymer particles of 0.2 to 3 wt. %. The cycle life is defined by a cycle number at which the battery capacity becomes 80% of the initial capacity at 25° C. The negative electrode shows no appreciable decrease in the specific surface area at the end cycle. This effect is larger than that obtained by adding the porous silica of equal amount in place of porous polymer particles. The active material including porous polymer particles of higher than 3 wt % loses the viscosity during the kneading and makes it difficult to be applied to the grid alloy.

(Example 2)

The following description will be directed to the second embodiment of the present invention. In a similar way to that of the first embodiment, the porous polymer particles are composed of styrene divinyl benzene copolymer having three dimensional crosslinking structure therein (average particle size, 0.4 mm, pore size, 0.1 to 5 μmm). The porous polymer particles have sulfuric acid impregnated sufficiently therein with a vacuum impregnation method (density, 1.3 g/cm$^3$). In the vacuum impregnation method, in order to prevent the porous polymer particles from floating on sulfuric acid, the porous polymer particles are packed with a resin sheet resistant to sulfuric acid and are immersed in sulfuric acid. The porous polymer particles packed with the resin sheet and sulfuric acid are inserted in a vacuum chamber for execution of the vacuum impregnation.

An active material is composed of lead powder of 100 weight part, the porous polymer particles impregnated with sulfuric acid of 1 weight part, sulfuric acid (density, 1.35 g/cc) of 5 weight part, water of 10 weight part, barium sulfate, $BaSO_4$ of 1 weight part, and lignin of 0.2 weight part. The above mixture is kneaded into a paste form and is applied to a grid composed of Pb-Ca alloy. Then the paste on the grid is subjected to immersion in an acid and an aging. The resultant active material is formed into a negative electrode plate having a apparent density of 5.1 g/cm$^3$ in a similar way to that of the first embodiment.

The battery container has 6 pieces of negative electrode plates formed in the above way and 7 pieces of positive electrode plates 21 of conventional composition inserted therein. The negative electrode plate is packed with a separator composed of glass fiber. The electrolyte sulfuric acid is adjusted to be a density of 1.30 g/cm$^3$ after the formation and then is pored into the battery container. Finally, the negative electrode limited sealed lead acid battery is completed by being subjected to the formation process.

Figure 6:
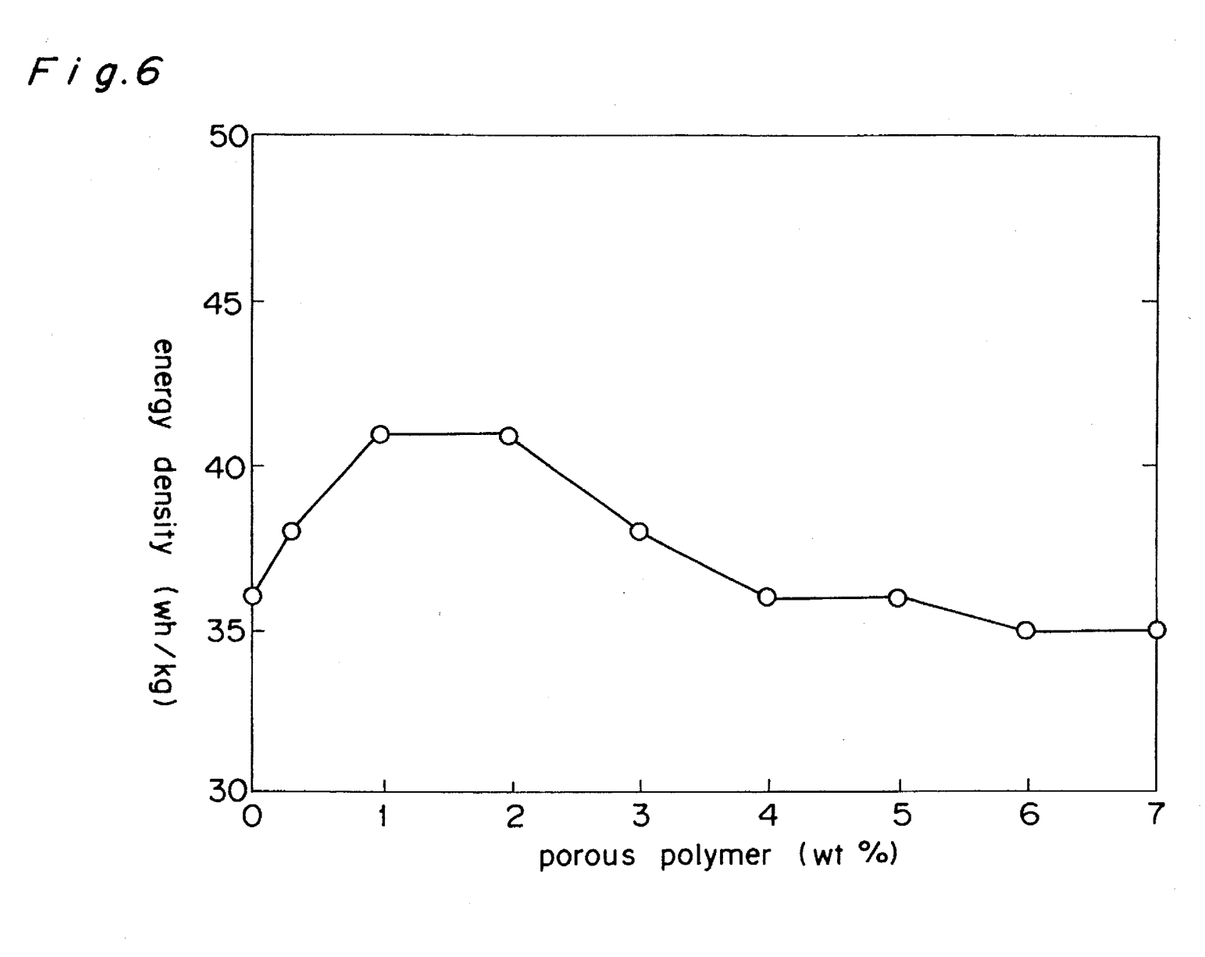
FIG. 6 is a graph showing a relationship between the amount of the porous polymer particles and the cycle life in accordance with the second embodiment of the present invention.

The sealed lead acid battery prepared by a way mentioned above has a capacity that the discharge amount of a 3 hour rate is 62 Ah and the energy density is 41 Wh/kg (conventional sealed lead acid battery has a capacity of 36 Wh/kg). FIG. 3 is a graph showing a relationship between the capacity and the cycle number at 0.2 C charge and discharge operation. FIG. 6 is a graph showing a relationship between the amount of the porous polymer particles and the energy density. The porous polymer particles of 0.3 to 5 wt. % shows an energy density higher than the conventional energy density. The cycle test at 0.2 C charge discharge operation also shows that the sealed lead acid battery according to the second embodiment of the present invention shows a cycle life of 450 cycles which is a much improved number (conventional battery has only 120 cycles). The porous polymer particles of an amount higher than 5 wt. % results in a decrease in an amount of lead active material which contributes to the battery reaction and accordingly in a decrease in the energy density. Further, the porous polymer particles of an amount higher than 5 wt. % forms a brittle paste which is hardly applied to the grid alloy.

The active material according to the second embodiment of the present invention is relatively rigid (the conventional active material has an apparent density of 4.8 to 5.0 g/cm$^3$). Although the conventional active material having a low porosity, the resultant battery is lacking in sulfuric acid and is not provided with sufficient capacity. Compared to this, the use of porous polymer particles having sulfuric acid impregnated therein results in a state of the active material filled with sulfuric acid and thus an improvement in the capacity in accordance with the present invention. Further, sulfuric acid is present sufficiently in the active material and is supplied quickly to the battery reaction at a discharge operation at a high efficiency, thereby increasing the capacity by 20%. The discharge characteristic at lower temperature is also improved by the sealed lead acid battery according to the second embodiment of the present invention.

(Example 3)

The following description will be directed to the third embodiment of the present invention. In a reverse way to that of the second embodiment, the positive electrode is composed of an active material including porous polymer particles. The porous polymer particles have sulfuric acid impregnated therein by a centrifuge method (average particle size, 0.6 mm, pore diameter, 0.1 to 10 μmm). An active material is composed of lead powder of 100 weight part, the porous polymer particles with sulfuric acid of 2 weight part, sulfuric acid of 10 weight part, and water of 10 weight part. The above mixture is kneaded into a paste form and is applied to a grid composed of Pb—Ca alloy. Then the paste on the grid is subjected to immersion in an acid and an aging. The resultant active material is formed into a positive electrode plate having a apparent density of 4.7 g/cm$^3$ (usual positive electrode plate has an apparent density of 4.3 to 4.5 g/cm$^3$).

The battery container has 6 pieces of positive electrode plates formed in the above way and 7 pieces of negative electrode plates of conventional composition inserted therein. The positive electrode plate is packed with a separator composed of glass fiber. The electrolyte sulfuric acid is adjusted to be a density of 1.30 g/cm$^3$ after the formation and then is poured into the battery container. Finally, a positive electrode limited sealed lead acid battery is completed by being subjected to the formation process.

The sealed lead acid battery prepared by the way mentioned above has a capacity that the discharge amount of a 3 hour rate is 64 Ah hand the energy density is 43 Wh/kg.

Figure 5:
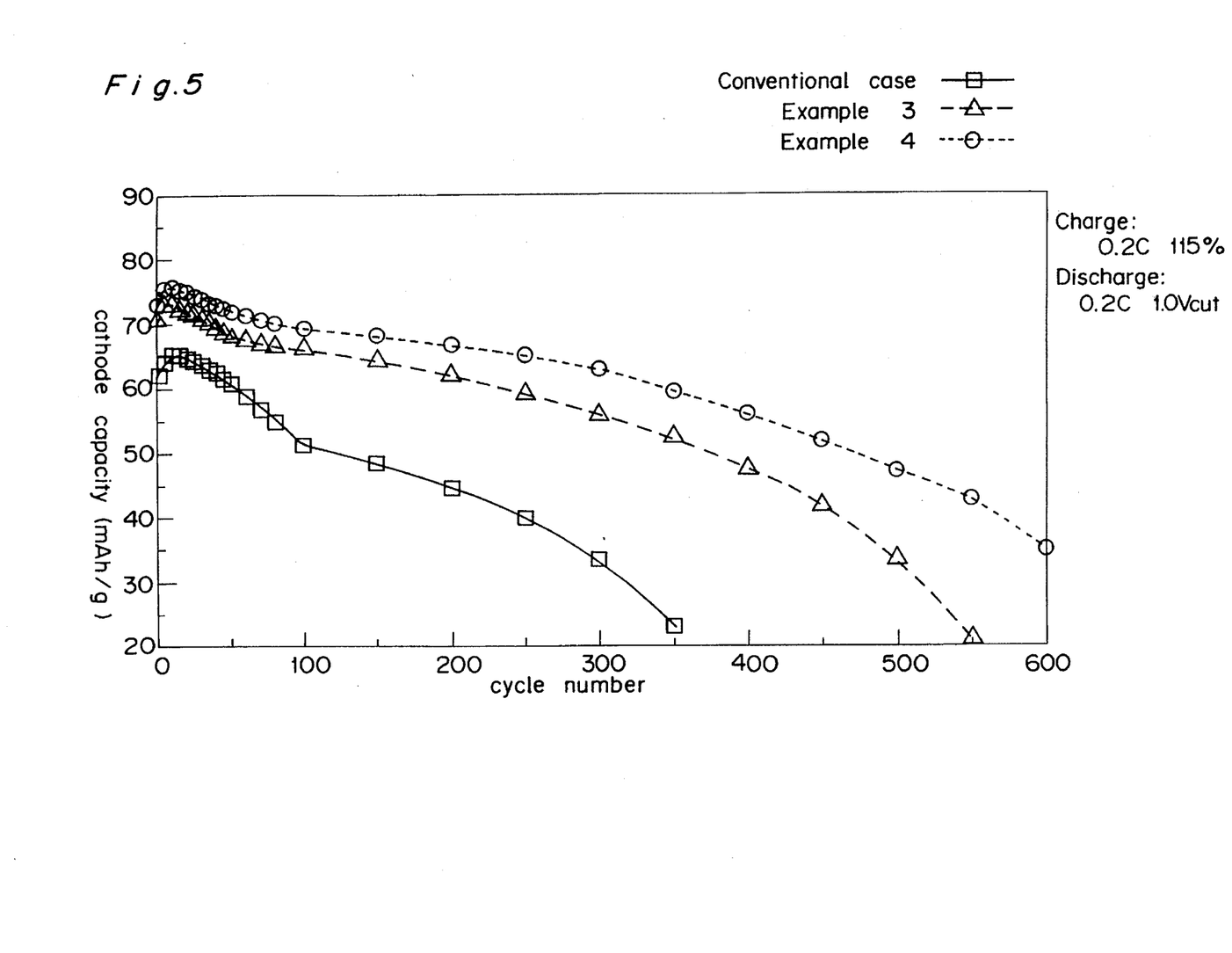
FIG. 5 is a graph showing a relationship between the capacity and the cycle number of the sealed lead acid battery according to the third and fourth embodiments of the present invention.

The porous polymer particles of 0.3 to 5 wt. % shows an energy density higher than the conventional energy density in a similar way to that of the second embodiment where the porous polymer particles are added to the negative electrode plate. FIG. 5 is a graph showing the relationship between the capacity and the cycle number at 0.2 C charge and discharge operation. It can be seen that the conventional sealed lead acid battery has a cycle life of 120 cycles but the sealed lead acid battery according to the third embodiment of the present invention has a cycle life of 300 cycles. Further, the conventional sealed lead acid battery shows a decrease in the charge capacity by 20% at 1 C discharge rate while the sealed lead acid battery according to the third embodiment of the present invention shows a decrease only by 16%.

At the end period of the cycle test, the porous polymer particles disappear because of partial oxidation but the oxidation rate is lower than that of the usual polymer because the porous polymer particles used in this embodiment have a molecular bonding strength higher than the usual polymer. A preferable particle size of the porous polymer particles is 0.1 to 0.8 mm in view of a dispersion. A preferable pore diameter is 0.05 to 10 μm in view of the impregnation and maintenance of sulfuric acid. An addition of 3 wt % of porous silica instead of porous polymer particles results in an energy density of 38 Wh/kg and a cycle life of 150 to 200 cycles.

(Example 4)

The following description will be directed to the fourth embodiment of the present invention. the negative electrode plate is prepared by using porous polymer particles having sulfuric acid impregnated therein in a similar way to that of the second embodiment. The positive electrode plate is prepared by porous polymer particles having sulfuric acid impregnated therein in a similar way to that of the third embodiment. The battery container has 7 pieces of the negative electrode plates mentioned above and 6 pieces of the positive electrode plates mentioned above inserted therein. The positive electrode plate is packed with a separator composed of glass fiber. The electrolyte sulfuric acid is adjusted to be a density of 1.30 g/cm$^3$ after the formation and then is poured into the battery container. Finally, the positive electrode limited sealed lead acid battery is completed by being subjected to the formation process. FIG. 5 shows a graph illustrating the relationship between the capacity and the cycle number at 0.2 C discharge and charge operation.

The sealed lead acid battery according to the fourth embodiment of the present invention shows an initial capacity at the positive electrode larger than that of the conventional battery by 20% and a cycle life more than that of the conventional battery by 350 cycles.

When the sealed lead acid batteries according to the fourth embodiment of the present invention are assembled to a set of batteries for use in an electric car, it can provides the battery lighter with 20% than that of conventional batteries which has a weight of 400 Kg more capacity. Accordingly, it is possible to improve the electric car in the acceleration power and a running distance by one charging operation.

It is understood that various other modifications will be apparent to and can be readily made by those skilled in the art without departing from the scope and spirit of the present invention. Accordingly, it is not intended that the scope of the claims appended hereto to be limited to the description as set forth herein, but rather that the claims be construed as emcompassing all the features of patentable novelty that reside in the present invention, including all features that would be treated as equivalents thereof by those skilled in the art to which the present invention pertains.

What is claimed is:

1. A sealed lead acid battery comprising a positive electrode, a negative electrode, a separator, an aqueous electrolyte and a battery casing characterized in that the positive electrode and/or the negative electrode comprises an active material added with porous polymer particles composed or mainly composed of a copolymer of styrene-divinylbenzene having a pore diameter of 0.05 to 10 μm.

2. A sealed lead acid battery according to claim 1, wherein said active material contains porous polymer particles of 0.2 to 3% by weight.

3. A sealed lead acid battery according to claim 1, wherein said porous polymer particles have a particle size of 0.1 to 0.8 mm.

4. A sealed lead acid battery according to claim 1 or 8, wherein said active material of the positive electrode has an apparent density higher than 4.5 g/cm$^3$.

5. A sealed lead acid battery according to claim 1 or 8, wherein said active material of the negative electrode has an apparent density higher than 5.1 g/cm$^3$.

6. A sealed lead battery according to claim 1 wherein, the porous polymer particles are beads.

7. A sealed lead battery according to claim 1 wherein, the porous polymer particles have an apparent density of less than 0.5 g/cm$^3$.

8. A sealed lead battery comprising a positive electrode, a negative electrode, a separator, an aqueous electrolyte and a battery casing characterized in that the positive electrode and/or the negative electrode comprises an active material added with porous particles which are composed of a copolymer of styrene-divinylbenzene.

9. A sealed lead acid battery comprising a positive electrode, a negative electrode, a separator, an aqueous electrolyte and a battery casing characterized in that the positive electrode and/or the negative electrode comprises an active material added with porous polymer particles having a particle size of 0.1 to 0.8 mm, a pore diameter of 0.05 to 10 μm and an apparent density of less than 0.5 g/cm$^3$ in which the porous polymer particles have been previously impregnated with the aqueous electrolyte by either a vacuum impregnation or a centrifuge method.

10. A sealed lead acid battery according to claim 9, wherein the porous polymer particles are beads.

11. A sealed lead acid battery according to claim 9, wherein the active material contains a porous polymer particle of 0.3 to 0.5% by weight, which is previously impregnated with sulfuric acid.

12. A sealed lead acid battery comprising a positive electrode, a negative electrode, a separator, an aqueous electrolyte and a battery casing characterized in that the positive electrode and/or the negative electrode comprises an active material added with porous polymer particles composed or mainly composed of a copolymer of styrene-divinylbenzene in which the porous polymer particles have been previously impregnated with the aqueous electrolyte by either a vacuum impregnation or a centrifuge method.

13. A sealed lead acid battery according to claim 12, wherein the copolymer of styrene-divinylbenzene has a particle size of 0.1 to 0.8 mm, a pore diameter of 0.05 to 10 μm and an apparent density of less than 0.5 g/cm$^3$.

14. A sealed lead acid battery according to claim 12, wherein the porous polymer particles are beads.

* * * * *